US008336698B2

(12) United States Patent
Mulvey

(10) Patent No.: US 8,336,698 B2
(45) Date of Patent: Dec. 25, 2012

(54) MONEY ITEM ACCEPTOR

(75) Inventor: Kevin Charles Mulvey, Warrington (GB)

(73) Assignee: Money Controls Limited, Royton Oldham (GB)

( * ) Notice: Subject to any disclaimer, the term of this patent is extended or adjusted under 35 U.S.C. 154(b) by 0 days.

(21) Appl. No.: 13/089,087

(22) Filed: Apr. 18, 2011

(65) Prior Publication Data

US 2011/0196816 A1 Aug. 11, 2011

Related U.S. Application Data

(63) Continuation of application No. 10/538,685, filed as application No. PCT/GB03/05453 on Dec. 15, 2003, now Pat. No. 7,946,408.

(30) Foreign Application Priority Data

Jan. 10, 2003 (GB) .................................. 0300633.5

(51) Int. Cl.
*G07D 7/00* (2006.01)
*G06F 17/00* (2006.01)

(52) U.S. Cl. .......................................... 194/302; 700/90

(58) Field of Classification Search .................. 194/302; 235/379; 73/163; 700/47, 48, 50, 67; 706/12, 706/13, 45; 702/57, 127; 382/135, 136
See application file for complete search history.

(56) References Cited

U.S. PATENT DOCUMENTS

| | | | | |
|---|---|---|---|---|
| 4,538,719 | A | 9/1985 | Gray et al. | |
| 4,951,799 | A * | 8/1990 | Kai | 194/317 |
| 5,255,344 | A | 10/1993 | Takagi et al. | |
| 5,355,989 | A | 10/1994 | Best | |
| 2001/0009485 | A1 | 7/2001 | Furuya | |

FOREIGN PATENT DOCUMENTS

| | | | |
|---|---|---|---|
| EP | 0399694 | A2 | 11/1990 |
| EP | 048736 | A2 | 4/1992 |
| GB | 2169429 | A | 7/1986 |
| JP | 2-197985 | A | 8/1990 |

OTHER PUBLICATIONS

Buckley, J.J. et al., Hybrid Neutral Nets Can Be Fuzzy Controllers and Fuzzy Expert Systems, Fuzzy Sets and Systems, Elsevier Science Publishers, Amsterdam, NL, vol. 60, No. 2, Dec. 10, 1993.

* cited by examiner

*Primary Examiner* — Mark Beauchaine
(74) *Attorney, Agent, or Firm* — Orrick Herrington & Sutcliffe, LLP

(57) ABSTRACT

A method and system for accepting money items. The method for accepting money items comprises generating a money item signal that corresponds to a money item under test, determining a level of risk of a fraud attempt, and determining a fraud attempt based on the level of risk. The method further comprises generating a transformed money item signal as a function of the level of risk and the money item signal in response to determining the fraud attempt. The method further comprises comparing the transformed money signal to window limit values to generate a result and accepting or rejecting the money item based on the result.

14 Claims, 3 Drawing Sheets

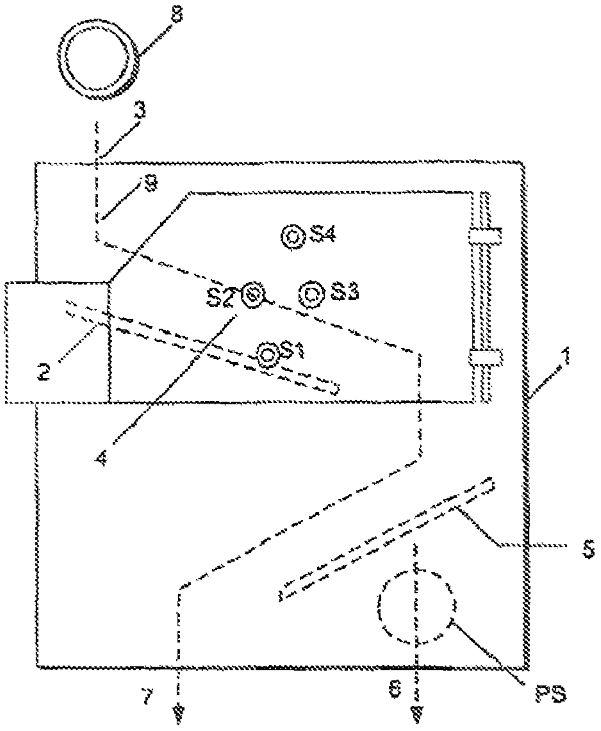
FIG. 1
FIG. 2
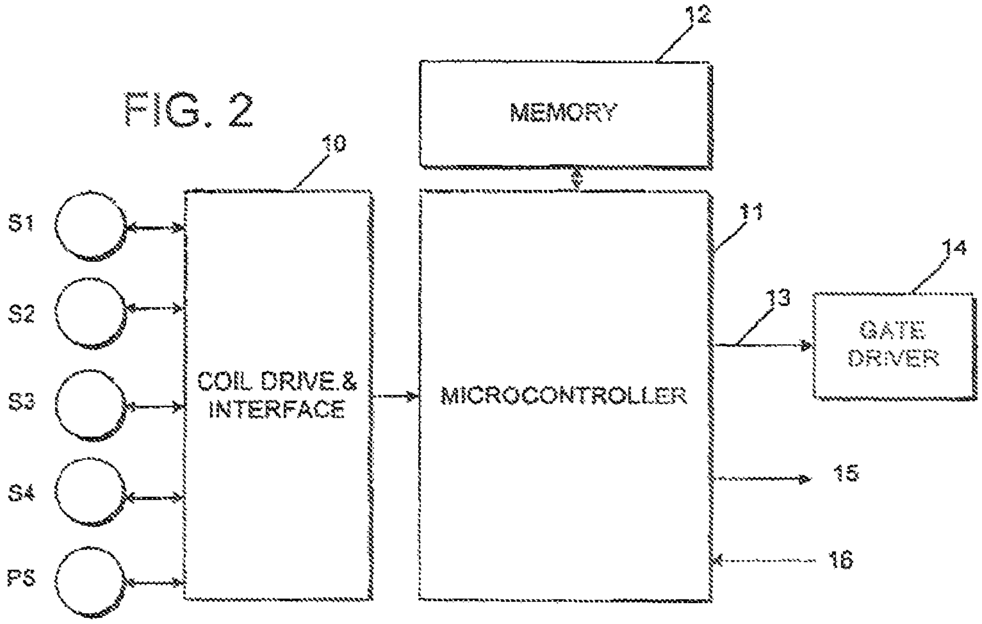

MONEY ITEM ACCEPTOR

RELATED APPLICATIONS

This application is a continuation of U.S. patent application Ser. No. 10/538,685, which entered national stage on Nov. 10, 2005 now U.S. Pat. No. 7,946,408, from International Application No. PCT/GB2003/05453, filed Dec. 15, 2003. Co-pending U.S. patent application Ser. No. 10/538,685 claims priority benefits to Foreign Application No. GB 0300411.6 under 35 U.S.C §365(b). Each of these applications is hereby incorporated in their entirety by reference. This application claims priority benefits to co-pending U.S. patent application Ser. No. 10/538,685 under 35 U.S.C §120.

FIELD OF THE INVENTION

This invention relates to an acceptor for money items such as coins and banknotes and has particular but not exclusive application to a multi-denomination acceptor.

BACKGROUND OF THE INVENTION

Coin and banknote acceptors are well known. One example of a coin acceptor is described in our GB-A-2 169 429. The acceptor includes a coin rundown path along which coins pass through a coin sensing station at which sensor coils perform a series of inductive tests on the coins in order to develop coin parameter signals which are indicative of the material and metallic content of the coin under test. The coin parameter signals are digitised and compared with stored coin data by means of a microcontroller to determine the acceptability or otherwise of the test coin. If the coin is found to be acceptable, the microcontroller operates an accept gate so that the coin is directed to an accept path. Otherwise, the accept gate remains inoperative and the coin is directed to a reject path.

In banknote validators, sensors detect characteristics of the banknote For example, optical detectors can be used to detect the geometrical size of the banknote, its spectral response to a light source in transmission or reflection, or the presence of magnetic printing ink can be detected with an appropriate sensor. The parameter signals thus developed are digitised and compared with stored values in a similar way to the previously described prior art coin acceptor. The acceptability of the banknote is determined on the basis of the results of the comparison.

When a number of coins or banknotes of the same denomination are passed through an acceptor, successive values of coin or banknote parameter data are thus developed. When the distribution of the values of these signals is plotted as a graph, the result is a bell curve, with a central peak and tails on opposite sides. The shape of the graph may typically although not necessarily be Gaussian.

The distribution illustrates that for a money item, such as a coin or banknote of a particular denomination, the most probable value of the corresponding parameter signal lies at the peak of the bell curve, with a decreasing probability to either side. In prior coin and banknote acceptors data is stored in a memory, corresponding to acceptable ranges of parameter signal for a particular denomination. The acceptor compares the value for a coin or banknote under test with the stored data to determine authenticity. The data may define windows in terms of upper and lower limit values; or as a mean value and a standard deviation, such that the window comprises a predetermined number of standard deviations about the mean. By making the stored windows narrow, an increased discrimination is provided between true money items and frauds. However, if the windows are made too narrow, the rejection rate of true money items increases, disadvantageously. The width of the windows is thus selected as a compromise between these two factors. Attempts to defraud coin or banknote acceptors typically involve the manufacture of facsimile coins or banknotes, which cause the acceptor to produce parameter signals which lie within the stored acceptance windows. Hitherto, coin acceptors have been provided with relatively wide and narrow window widths so that the operator can manually select the wide window width for normal operation and the narrow window width if frauds are being presented for validation. An example is described in Japanese unexamined patent application no Hei 2-197985.

A number of different approaches have been proposed to vary the window width dynamically to improve discrimination between true and false coins. In U.S. Pat. No. 5,355,989, a coin acceptor is described which switches automatically from a first normal acceptance window for a true coin, to a second narrower window when a coin parameter signal produced by testing a coin falls in a region of the normal window for the true coin corresponding to a low acceptance probability region for the coin concerned. A group of fraudulent coins may all have similar characteristics and they may cause the acceptor to produce parameter signals which lie within the normal window, but the parameter signals consistently have a value which is not centred on the high probability peak region of the window associated with the true coin and instead are centred on the lower probability tail regions of the bell curve distribution within the normal window. When the parameter signal falls within this low probability region, the second narrower window is then used for the next tested coin. If the next coin has a parameter falling in the narrower window it is a true coin, but if not, it is a fraud that should be rejected. This approach seeks to prevent frauds carried out by the use of coins of a particular low value denomination, from a foreign currency set, with characteristics that correspond but are not exactly the same as a high value coin of the currency set that the acceptor is designed to accept. It will be understood that the foreign denomination coins exhibit their own generally Gaussian distribution of parameter signals, and if the low probability or tail region of this distribution partially overlaps a corresponding region of the distribution for the true coin that the acceptor is designed to accept, then the low value foreign coins will sometimes be accepted as true coins.

Another approach is described in EP-A-0480736, in which the acceptance window is based on the value of a coin parameter for previous acceptable coins, as long as the previous coin parameter values do not deviate significantly from one another. This enables the coin acceptor to self-tune the window to take account of changes in operating parameters such as temperature and other long term drifts. A danger with this approach is that the coin acceptor can be taught to modify its window so as to accept frauds by using fraudulent coins similar to true coins. To overcome this problem, a so-called near miss area is defined and if a coin parameter signal from a coin under test falls in this area, this indicates the risk of a fraud and the window is shifted away from the area to prevent the window position being influenced by the potential fraud. However, the position of the near miss area is critical in order to avoid falsely detecting true items as a fraud attack. To this end the near miss area must be a reasonable distance outside of the true coin population (particularly if the error in positioning the centre of the window is taken into account). This creates a gap were a sufficiently close fraud attempt can still trigger a window shift before it is spotted in the near miss area. It may also be possible to utilise slightly modified true coins or even a different fraud on the other side of the window to train the window towards the original fraud attempt. The method described in EP-A-0480736 is therefore only of use for relatively poor quality frauds and a more stringent systems is needed to counter a stronger fraud attack.

SUMMARY OF THE INVENTION

The present invention provides an alternative approach, which does not involve the complication of having to control the window width.

According to the invention there is provided a method of accepting of money items, comprising: generating individual money items signals with a value that is a function of respective items of money under test, developing for each of the money items under test, a transformed money item signal as a function of the value of the money item signal and at least one variable parameter that is a function of the acceptability criterion for the money item under test, making a comparison of the values of the transformed money item signals with a window limit value, and accepting each money item in dependence upon said comparison.

The variable parameter may be a function of history data relating to the values of the money item signals for previously tested money items.

The transformed money item signal may developed by transforming the money item signal according to the outcome of a rules based expert system that determines the occurrence of the acceptability criterion. More particularly, the transformed money item signal may be developed by scaling the money item signal for a money item under test in accordance with an amplification factor determined in dependence on the outcome of a comparison of data based on previously tested money items with one or more rules. Different amplification factors may be used, depending on the outcome of the comparisons for the rules.

An average of data corresponding to the money item signals for previously tested money items may be compared with a first limit value lying within a window delimited by said window limit, and if the average is not within said first limit, the money item signal for a money item under test may be scaled in accordance with the amplification factor.

Also, a maximum value of data corresponding to the values of money item signals for previously tested money items may be compared with a second limit value lying within a window delimited by said window limit, and if said maximum value is not within said second limit, the money item signal for a money item under test may be scaled in accordance with the amplification factor.

The window limit may delimit an acceptance window as deviation relative to a window mean, and the value of a money item signal for a money item may be adjusted relative to the window mean, mode or median, whereby to produce an error signal and the transformed money item signal may be developed from the error signal.

The invention also includes an acceptor for money items, comprising: sensor circuitry to provide individual money items signals of a value as a function of respective items of money under test, and a processor configuration to develop for each of the money items under test, a transformed money item signal as a function of the value of the money item signal and at least one variable parameter that is a function of a acceptability criterion for the money item

BRIEF DESCRIPTION OF THE DRAWINGS

In order that the invention may be more fully understood an embodiment thereof will now be described by way of example with reference to the accompanying drawings in which:

FIG. 1 is a schematic block diagram of a coin acceptor in accordance with the invention;

FIG. 2 is a schematic block diagram of the circuits of the acceptor shown in FIG. 1;

DETAILED DESCRIPTION

Overview of Coin Acceptor

Figure 3:
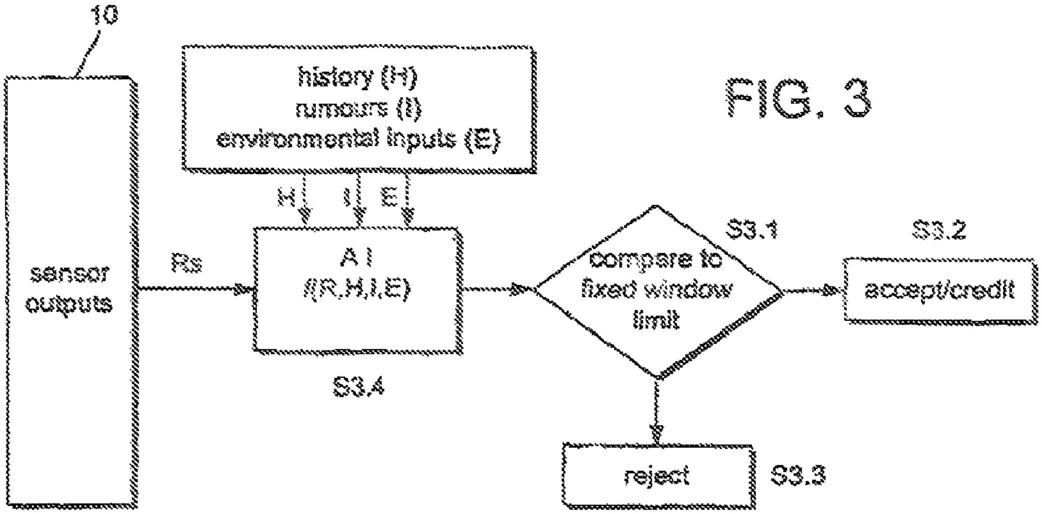
FIG. 3 is a schematic block diagram of a coin acceptance process carried out by the microcontroller shown in FIG. 1.

FIG. 1 illustrates the general configuration of an acceptor according to the invention, for use with coins. The coin acceptor is capable of validating a number of coins of different denominations, including bimet coins, for example the euro coin set and the UK coin set including the bimet £2.00 coin. The acceptor includes a body 1 with a coin run-down path 2 along which coins under test pass edgewise from an inlet 3 through a coin sensing station 4 and then fall towards a gate 5. A test is performed on each coin as it passes through the sensing station 4. If the outcome of the test indicates the presence of a true coin, the gate 5 is opened so that the coin can pass to an accept path 6, but otherwise the gate remains closed and the coin is deflected to a reject path 7. The path through the acceptor for a coin 8 is shown schematically by dotted line 9.

The coin sensing station 4 includes four coin sensing coil units S1, S2, S3 and S4, which are energised in order to produce an inductive coupling with the coin. Also, a coil unit PS is provided in the accept path 6, downstream of the gate 5, to act as a credit sensor in order to detect whether a coin that was determined to be acceptable, has in fact passed, into the accept path 6.

The coils are energised at different frequencies by a drive and interface circuit 10 shown schematically in FIG. 2. Eddy currents are induced in the coin under test by the coil units. The different inductive couplings between the four coils and the coin characterise the coin substantially uniquely. The drive and interface circuit 10 produces corresponding digital coin parameter data signals $R_s$, namely $R_1$, $R_2$, $R_3$, $R_4$, as a function of the different inductive couplings between the coin and the coil units S1, S2, S3 and S4. A corresponding signal is produced for the coil unit PS. The coils S have a small diameter in relation to the diameter of coins under test in order to detect the inductive characteristics of individual chordal regions of the coin.

In order to determine coin authenticity, the coin parameter signals produced by a coin under test are fed to a microcontroller 11, which is coupled to a memory 12. The microcontroller 11 processes the coin parameter signals $R_1 \ldots R_4$ derived from the coin under test and compares the outcome with corresponding stored values held in the memory 12. The stored values are held in terms of windows having upper and lower value limits. Thus, if the processed data falls within the corresponding windows associated with a true coin of a particular denomination, the coin is indicated to be acceptable, but otherwise is rejected. If acceptable, a signal is provided on line 13 to a drive circuit 14 which operates the gate 5 shown in FIG. 1 so as to allow the coin to pass to the accept path 6. Otherwise, the gate 5 is not opened and the coin passes to reject path 7. The coin acceptance process performed by the microcontroller 11 may be modified or updated in response to an external input received on line 16.

The microcontroller 11 compares the processed data with a number of different sets of operating window data from the memory 12, appropriate for coins of different denominations so that the coin acceptor can accept or reject more than one coin of a particular currency set. If the coin is accepted, its passage along the accept path 6 is detected by the post acceptance credit sensor coil unit PS, and the unit 10 passes corresponding data to the microcontroller 11, which in turn provides an output on line 15 that indicates the amount of monetary credit attributed to the accepted coin.

The sensor coil units S each include one or more inductor coils connected in an individual oscillatory circuit and the coil drive and interface circuit 10 includes a multiplexer to scan outputs from the coil units sequentially, so as to provide data to the microcontroller 11. Each circuit typically oscillates at a frequency in a range of 50-150 kHz and the circuit components are selected so that each sensor coil S1-S4 has a different natural resonant frequency in order to avoid cross coupling between them.

As the coin passes the sensor coil unit S1, its impedance is altered by the presence of the coin over a period of—100 milliseconds. As a result, the amplitude of the oscillations through the coil is modified over the period that the coin passes and also the oscillation frequency is altered. The variation in amplitude and frequency resulting from the modulation produced by the coin is used to produce the coin parameter signals $R_1 \ldots R_4$ representative of characteristics of the coin.

Coin Acceptance Process

FIG. 3 is a schematic illustration of the process carried out by the microcontroller 11. The process will be described in relation to one of the coin parameter signals $R_s$ in order to simplify the description and it will be understood that a corresponding process will be carried out for each of the coin parameter signals individually. As shown in FIG. 3, coin parameter signal $R_s$ is derived from the coin interface and drive circuitry 10 shown in FIG. 2. The signal $R_s$ is converted into a digital signal with a numerical value that corresponds to the coin that gave rise to the signal. The digital conversion may be carried out by the micro controller 11 or within the coin drive and interface circuitry 10 itself. The value of coin parameter signal $R_5$ is compared with a fixed window limit in step S3.1, the window limit being stored in the memory 12. A coin acceptance or rejection signal is produced depending on the outcome of the comparison, as shown at steps S3.2 and S3.3.

Artificial intelligence (AI) is utilised to transform at step S3.4 the value of the coin parameter signal $R_5$ prior to the comparison with the fixed window limit at step S3.3. The AI functionality transforms the coin parameter signal to take account of a number of factors, more particularly, the history of previous coins accepted or rejected, rumours such as indications from adjacent coin acceptors that fraudulent coins are being used in the vicinity and environmental inputs such as changes in temperature. For example, the coin parameter signals may be transformed as described in our EP-A-0399694 to take account of temperature changes or the presence of metal objects in the vicinity of the sensor coils, prior to comparison with the fixed window limit.

In this example, the AI functionality comprises a rules based expert system as will now be explained in more detail.

Figure 4:
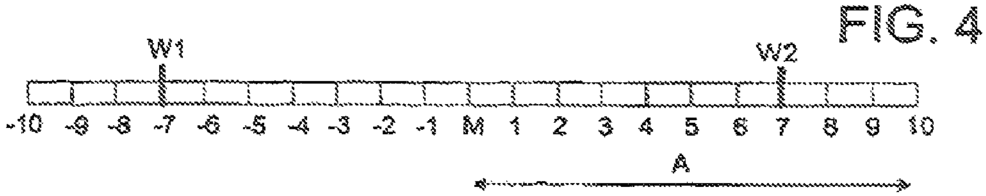
FIG. 4 illustrates the configuration of an acceptance window with a fixed window limit.

FIG. 4 illustrates an example of the fixed window used for the comparison process of step S3.1. The window is stored in terms of a mean value M corresponding to the average value of the coin parameter signal for a coin of a particular denomination. In order to accommodate coins which deviate from the mean, upper and lower fixed window limits W1 and W2 are provided around the mean and may be stored in terms of a deviation relative to the mean M. In the example of FIG. 4 the upper and lower window limits W1, W2 are ±7 relative to the mean M but of course other values can be used, which need not be symmetrically disposed about the mean. By providing a window, coins which deviate slightly from the mean will also be accepted. It will be appreciated that if the window width (W2−W1) is made too wide, there is an increased risk of fraudulent coins being accepted whereas if the Window width is made too narrow, there is a risk that a significant number of true coins will be rejected. The window width needs to be a compromise between these two considerations.

Hitherto it has been proposed to change the window when previous coin readings indicate that there is a risk that a fraudulent coin is being presented to the coin acceptor. The following example of the present invention provides an alternative, improved approach using AI in the form of a rules based expert system. The positive going region of the window from the mean value M to the fixed window limit W2 will be considered, namely region A in FIG. 4. It will be understood that similar considerations apply to the negative going region from mean value M to window limit W1, which will not be explained in detail in order to simplify the description.

Figure 5:
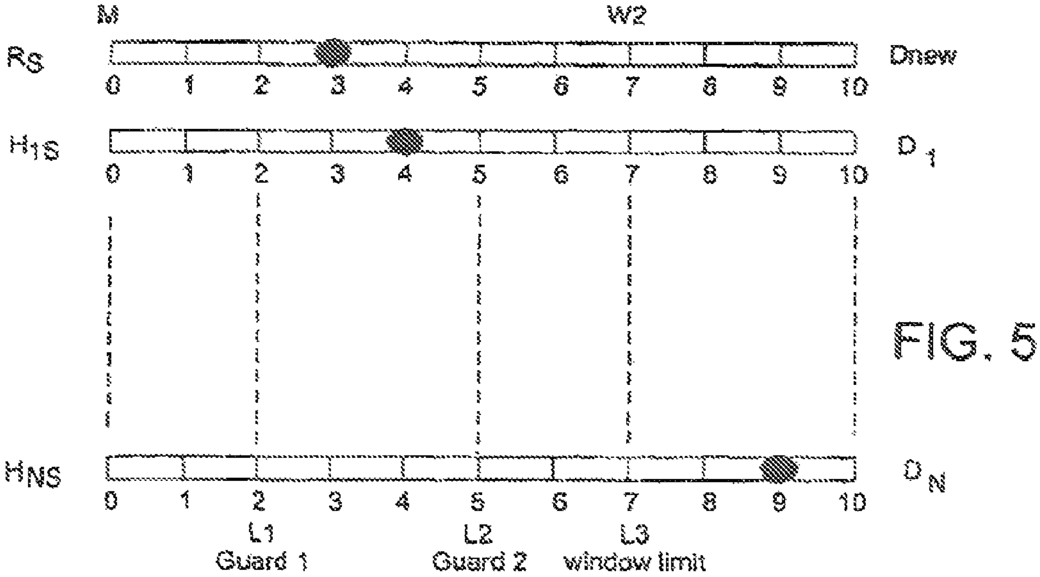
FIG. 5 is a schematic diagram of data derived from successive coins under test in relation to the fixed window data and other limits.

Referring to FIG. 5, the data derived from the latest or new value of the coin parameter signal $R_s$ is shown together with N previous values for previously tested coins of the same denomination $H1_5 \ldots HN_5$. The value of the coin parameter signal for each of the tested coins is shown as a black dot and the coin parameter value has been re-valued relative to the mean M for the fixed window. More particularly, the microcontroller 11 adjusts the values of the coin parameter signals $R_5$, $H1_5$ etc so as to produce corresponding adjusted data D for use in the rules based system. For example, considering the coin parameter $R_5$ for the coin currently under test, this gives rise to data $D_{new}$ where $D_{new}=R_S-M$ In this example, $D_{new}=3$ Corresponding adjusted historic data $D1 \ldots D_N$ are also derived corresponding to the historic coin parameter signals $H1_S \ldots HN_S$.

In this example, $D_1=4$ and $D_N=9$.

The microcontroller 11 is configured to store a predetermined number of previous values of the data $D_N$ for previously tested coins of the same denomination and to keep a running average of therm. For example, the last 10 values of $D_N$ may be stored and a running average $AVGD_N$ is computed. Also, the maximum value Max $D_n$ is determined from the stored data $D_n$ on a running basis. The values of Max $D_n$ and $AVGD_N$ are used as history data in the coin acceptance process.

Referring again to FIG. 4, when a number of true coins are tested, the corresponding value of $AVGD_N$ should lie close to the mean M. If the average value lies significantly away from the mean, this indicates there is a risk that the validator is under attack by fraudster using false coins. Also, if the value of Max $D_n$ lies more towards the window limit W2 than the mean M this indicates an increased risk that a fraud attempt is being made.

Figure 6:
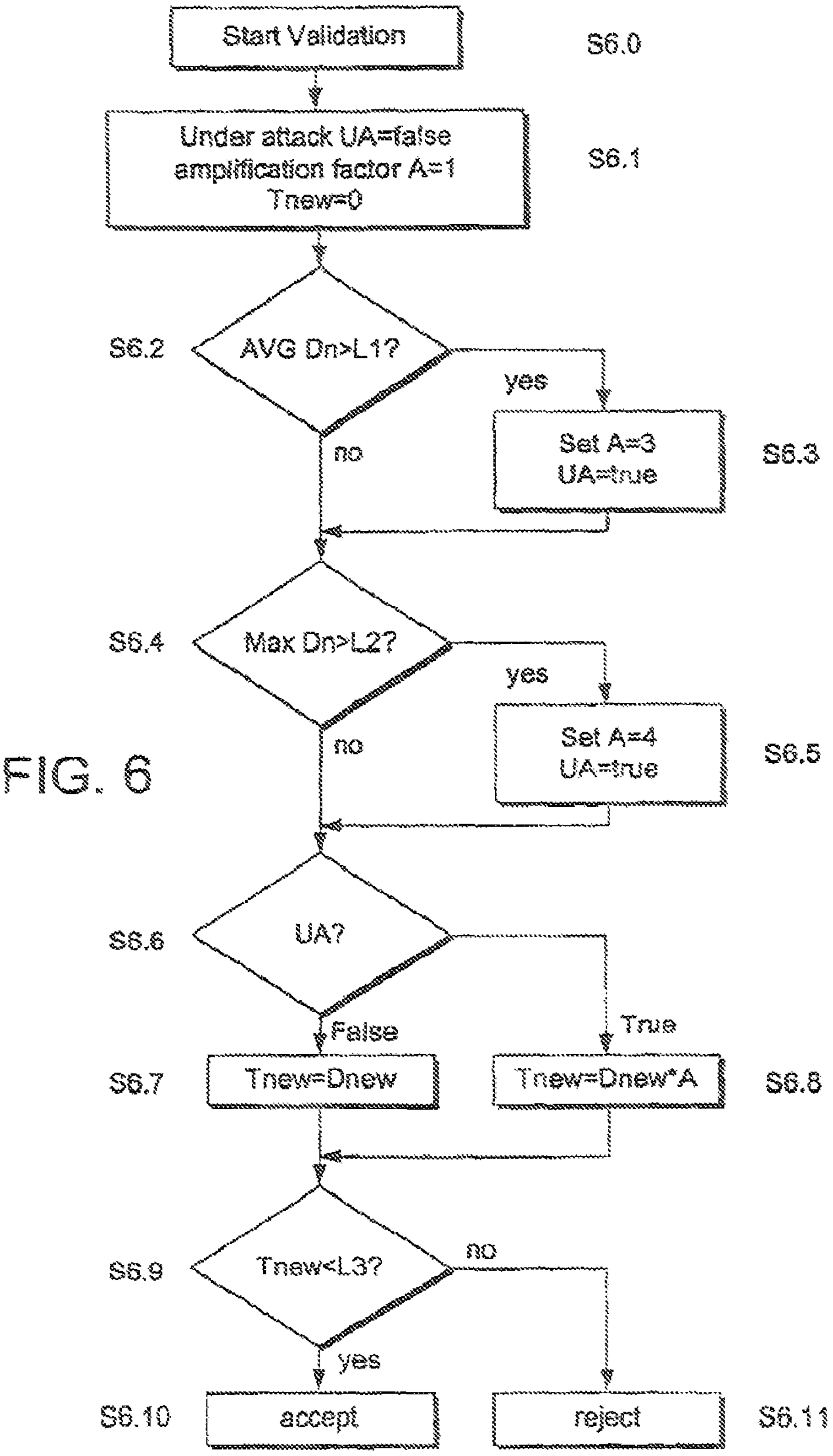
FIG. 6 is a flow diagram of a coin acceptance process in accordance with the invention.

FIG. 6 illustrates how the history data is used in the transformation of step S3.4 and the subsequent comparison of the transformed data, with the fixed window limit of step. S3.1. Referring to FIG. 6 in detail, the validation process starts at step S6.0 and at step S6.1, an “under attack” flag UA is set to the value “false”. Similarly, an amplification factor A is initially set to a value of unity and a transformed data parameter $T_{new}$ is initialised to zero.

Then, at step S6.2 the value of $AVGD_N$ is compared with an acceptability criterion defined by a limit value L1 shown in FIG. 5. Thus, if the average value of $D_n$ for the last 10 coins under test deviates significantly from the mean M, beyond the limit L1, then there is a risk that the coin acceptor is under attack by a fraudster and the flag UA is set to "true" at step S6.3. Also, the amplification factor A is set to a value >1. In this example, the amplification factor is set to a value of 3 for use subsequently in the transformation process to be described hereinafter.

At step S6.4, the previously computed value of Max $D_n$ is compared with an acceptability criterion defined by a guard limit L2, the value of which is shown in FIG. 5. If Max $D_n$ exceeds this limit value, this indicates that one of the previously tested coins has a value of D close to the fixed window limit W2, signifying the risk of a fraud amongst recently detected coins. In this case, the flag UA is set to "true" at step S6.5, indicating that the coin acceptor is under attack by a fraudster. Also, the amplification factor A is set to a value >1 e.g. 4.

Then, at step S6.6, the condition of the flag UA is tested to determine if the acceptor is under attack by a fraudster. If there is no fraud attack, the value of the transformed data parameter $T_{new}$ is set to be the same value as $D_{new}$ corresponding to the coin under test. The value of T is then compared with a limit value L3 at step S6.9. The limit value L3 corresponds to the fixed window limit W2 shown in FIG. 5. Thus, if the value of $T_{new}$ is less than L3, the data corresponds to an acceptable value of $D_{new}$ and hence an acceptable value of $R_S$ for the coin under test.

Conversely, if the $T_{new}$ exceeds the fixed window limit L3 then the coin should be rejected as shown at step S6.11.

In the event that the test of step S6.6 indicates the validator to be under attack, the value of $D_{new}$ for the coin under test is transformed using the amplification factor set at step S6.3 or S6.5. The transformation is carried at step S6.8 so that the parameter $T_{new}$ adopts a value of $D_{new}$*A. The transformed or amplified value is then compared with the fixed window limited L3 at step S6.9 as previously described. Thus, when the coin acceptor is under attack by a fraudster, a more stringent test is applied to the coin data D. It will be understood that because of the amplification factor, the actual value $D_{new}$ for the coin under test needs to be much closer to the value of the mean M for the window in order to be less than the fixed limit L3 as compared with the situation where the validator is not under attack and the amplification factor A is not applied.

Thus, in accordance with the invention, a more stringent test is applied when the acceptor is under fraud attack and in accordance with the invention, a fixed window limit L3 is utilised so that there is no need to change the window position or to switch between different window widths to achieve automatic security protection.

Many modifications and variations fall within the scope of the invention. For example, in certain situations, it may be preferable to test the value of $AVGD_N$ against the limit value L1 after testing the value of Max $D_n$ against limit L2. Also, the value of the amplification factor is not limited to the values given above and can be altered according to particular circumstances.

In the example described hereinbefore, the acceptability criteria corresponding to the limits L1 and L2 constitute fraud criteria for determining when a fraud attack occurs, and one or more amplification factors greater than one (A>1) are used in order to provide enhanced discrimination against frauds. However, when a run of acceptable coins has occurred, it may be advantageous to use an amplification factor 0>A<1 to increase the likelihood of coins being accepted when the risk of occurrence of a fraud is relatively low.

Also, the data used to produce the running average $AVGD_N$ and also Max $D_n$ may be time dependent, so that coin parameter signals from coins tested more than a particular time ago will be ignored for the purposes of determining $AVGD_N$ and Max $D_n$.

Furthermore, the rules based expert system can include additional or alternative rules for determining the criteria under which the amplification factor A is applied in response to a fraudster. Also, different rules can be used that do not use comparisons between scaled signals and thresholds. Furthermore, transformations other than a simple amplification may be used, such as non-linear transformations, offsets and combinations thereof. For example, as shown schematically in FIG. 3, rumours (I) from adjacent coin acceptors that a fraudster is in the vicinity of a group of machines may be used to set the value of the amplification factor A or other transformation for a period of time so as to apply a more stringent test to coins in response to the rumour. The rumour data may be received on input 16 shown in FIG. 2. Also, environmental inputs such as temperature may be applied to impose additional rules based tests to the data as a function of temperature or time of day, for example in a situation where frauds are found to happen at particular times e.g. pub closing time. Also, environmental inputs may be used to shift the window limits W1, W2 long term over time to take account of changes in temperature or other factors.

In the foregoing example, the processing of signals for one of the sensors S is described and it will be understood that each of sensor output is processed individually. The processing for one sensor may however take account of the outcome for another sensor and the occurrence of a fraud criterion for one of the sensors may be, used to set an acceptability criterion for the processing of signals for another of the sensors.

The invention is not limited to the use of an expert, rules based system to perform the AI process shown at step S3.4 in FIG. 3. Alternatives include fuzzy logic, the neural network or a genetic algorithm.

It will be appreciated that the various rules of the rules based system may be applied individually or collectively on a time basis so that a rule may be applied for a particularly time period and then removed either in response to a coin acceptance event or in response to external factors It will also be appreciated that the invention is not restricted to coin validators but may be used for other money items such as tokens, banknotes, cards and other items having an attributable monetary value.

The invention claimed is:

1. A method of accepting money items, comprising:
   - generating a money item signal that corresponds to a money item under test;
   - determining a level of risk of a fraud attempt;
   - determining a fraud attempt based on the level of risk;
   - generating a transformed money item signal as a function of the level of risk and the money item signal in response to determining the fraud attempt;
   - comparing the transformed money item signal to window limit values to generate a result; and
   - accepting or rejecting the money item based on the result.

2. The method of claim 1, further comprising storing historical money item signals that correspond to previously tested money items.

3. The method of claim 2, wherein determining the level of risk includes calculating an average value or a maximum value of the historical money item signals.

4. The method of claim 3, wherein determining the fraud attempt includes comparing the average or maximum value of the historical money item signals with an acceptability criterion.

5. The method of claim 3, wherein historical money item signals corresponding to money items that were tested more than a predetermined time before the testing of the money item under test are excluded for the purposes of calculating the average or maximum value.

6. The method of claim 1, wherein determining the fraud attempt employs at least one of a fuzzy logic system, neural network system, a genetic algorithm system, and a rule based expert system.

7. The method of claim 1, wherein generating the transformed money item signal includes amplifying the money item signal using an amplification factor.

8. The method of claim 1, wherein generating the transformed money item signal includes taking into account rune an indication from another coin acceptor that other fraud attempts are taking place nearby.

9. The method of claim 1, wherein generating the transformed money item signal includes taking into account the time of day at which fraud attempts occur frequently.

10. The method of claim 1, wherein generating the transformed money item signal includes taking into account an environmental temperature.

11. The method of claim 1, wherein generating the transformed money item signal includes taking into account a presence of metal objects in the vicinity of sensor coils.

12. The method of claim 1, wherein generating the transformed money item signal employs at least one of amplifications, non-linear transformations, offsets, and combinations thereof.

13. A method of accepting money items, comprising:

generating money items signals that are a function of money items under test;

developing an acceptability criterion dependent on a fraud attack;

developing for each of the money items under test, a transformed money item signal that is a function of the money item signal and at least one variable parameter that is a function of the fraud attack acceptability criterion and determined in response to the fraud attack having occurred;

making a comparison of the transformed money item signals with a window limit value; and accepting or rejecting each money item based on the comparison.

14. A method of accepting of money items, comprising:

generating money items signals that are a function of money items under test;

developing an acceptability criterion dependent on a fraud attack;

developing for each of the money items under test, a transformed money item signal that is a function of the money item signal and at least one variable parameter that is a function of the fraud attack acceptability criterion and determined in response to the fraud attack;

making a comparison of the transformed money item signals with a window limit value, and accepting or rejecting each money item based on the comparison.

* * * * *